United States Patent Office 2,887,489
Patented May 19, 1959

2,887,489

PROCESS AND INTERMEDIATE FOR ISOLATING RESERPINE

Alfred Becker, Munchenstein, and Max Feurer, Riehen, Switzerland, assignors to Ciba Pharmaceutical Products Inc., Summit, New Jersey No Drawing. Application April 3, 1957
Serial No. 650,286

Claims priority, application Switzerland April 9, 1956

6 Claims. (Cl. 260—286)

This invention relates to a new process for recovering reserpine or deserpidine.

Various processes for the manufacture of these alkaloids are known, including the purification of reserpine by reaction with acids or salts suitable for forming salts with weak bases. These processes are quite suitable for producing the alkaloids mentioned. However, the isolation of the pure alkaloids as a rule calls for special purification methods, such as chromatography or repeated fractional crystallization.

It has now been found that it is possible to obtain reserpine in a high degree of purity and thus to bring about a good separation of reserpine and deserpidine when the thiocyanate is prepared.

The starting material to be used for the salt formation may be of various kinds. It may be an extract from plants of the Rauwolfia and Alstonia species from which reserpine and substantially nothing else but further weakly basic alkaloids, such as deserpidine are isolated. There may be mentioned, more especially, the extracts obtained from the following plants: *Rauwolfia vomitoria* Afz., *Rauwolfia canescens*, *Rauwolfia serpentina* Benth., *Rauwolfia inebrians*, *Rauwolfia indecora* and *Alstonia constricta* F. Muell., the preparation of which is known. For example, a benzene or toluene extract of one of these plants, advantageously obtained from moistened plant material, especially root material, is produced and then used as starting material. There may likewse be used chloroform, ethylene-dichloride or trichlorethylene or acetone extracts. Alternatively an impure reserpine may be used as starting material, or there may be used a Rauwolfia or Alstonia extract from which the greater part of the reserpine has been removed and which contains a mixture of residual reserpine and deserpidine. In particular, there may be used as starting material mother liquors obtained from the first crystallization of reserpine, preferably such as contain deserpidine and residual reserpine in the approximate ratio of 1:1.

Depending on the starting material used, the new process can therefore be used, for example, for recovering reserpine and deserpidine, for purifying reserpine, for working up reserpine mother liquors to obtain reserpine and deserpidine or for splitting up mixtures of reserpine and deserpidine into their components.

According to one embodiment of the process the material containing reserpine is treated with thiocyanic acid, the alkaloid-thiocyanate is separated, converted into the free basic material, and reserpine isolated therefrom by crystallization and, if desired, deserpidine is isolated from the starting material separated from the alkaloid-thiocyanate formed and/or isolated from the mother liquor from the crystallization of reserpine.

Another possibility of bringing about said separation consists in forming, in a product containing reserpine, substantially only the thiocyanate of reserpine, which is accomplished by reaction with approximately the quantity of thiocyanic acid calculated as required for the conversion of the reserpine present into the thiocyanate, and separation of the salt.

The reaction with thiocyanic acid in the present process is advantageously applied to a solution of the starting material in an organic solvent, in which the reserpine thiocyanate is sparingly soluble, if desired in admixture with water. There are suitable, for example, solutions in halogenated aliphatic hydrocarbons, such as chloroform, methylene chloride, ethylene chloride, trichlorethane or the like, lower alcohols such as methanol or ethanol, ethers such as dimethyl ether, or fatty acids such as acetic acid, or mixtures of these substances, for example, a mixture of chloroform and ether, chloroform and methanol, methanol and water or methanol and acetic acid. The thiocyanic acid may be used as such or it may be formed in the reaction solution. Thus, for example, it may be used in the form of a salt thereof such as an alkali metal or alkaline earth metal salt, for example, potassium thiocyanate, calcium thiocyante or ammonium thioycanate. In this case the reaction solution must contain an acid such, for example, as a fatty acid, advantageously acetic acid or phosphoric acid, which sets free the thiocyanic acid. Alternatively, there may be used as starting material which contains reserpine in the form of a salt so that thiocyanic acid is obtained by double decomposition and reserpine thiocyanate is then formed.

The alkaloid thiocyanate can be removed from the reaction solution in a simple manner, for example, by filtration. It can be converted into the free basic material in the usual manner, for example, by treatment with an alkaline agent, such as ammonia or caustic soda solution. From the free basic material the reserpine can be obtained in a pure form by ordinary crystallization. It is especially advantageous to treat the salt in an aqueous methanolic solution with ammonia, whereupon pure reserpine crystallizes out.

Depending on the quantity of deserpidine contained in the starting material and on the quantity of thiocyanic acid used, the salt which separates may also contain deserpidine thiocyanate. When the basic material is set free and the subsequent crystallization is carried out, the deserpidine, being the more easily soluble alkaloid, remains in solution and can be isolated therefrom in known manner.

The following examples illustrate the invention, the parts being by weight unless otherwise stated, and the relationship of parts by weight to parts by volume being the same as that of the gram to the cubic centimeter:

*Example 1*

1 part of a pulverized extract obtained from root material of *Rauwolfia vomitoria* Afz. or *Rauwolfia serpentina* Benth. is dissolved warm in a mixture of 2 parts by volume of glacial acetic acid and 8 parts by volume of methanol, 6 parts by volume of water are added, while stirring, and the precipitate is filtered off. At a temperature of 60° C. the filtrate is inoculated with reserpine thiocyanate. 1 part by volume of potassium thiocyanate solution of 50 percent strength in water is added while stirring. The mixture is allowed to stand for a few hours at room temperature, and then the reserpine thiocyanate formed is filtered off with suction. The residue is washed with methanol.

1 part of reserpine thiocyanate is suspended in 8 parts by volume of methanol and 4 parts by volume of ammonia solution of 3.5 percent strength, and the whole is stirred at an internal temperature of 60° C. for 30 minutes. After being cooled, the whole is allowed to stand for a few hours at room temperature and the liberated reserpine is then filtered off with suction. The product is washed with water, methanol and a mixture of methanol and ether. In this manner pure reserpine is obtained.

The extract used as starting material can be obtained in the manner described in United States Patent No. 2,752,351. For example, 1 part of ground root material of *Rauwolfia serpentina* Benth. or *Rauwolfia vomitoria* Afz. may be uniformly moistened with 1 part by volume of water. The root material is then extracted with 5–10 parts by volume of toluene for 5–7 hours under reflux, the toluene being maintained at the boil at about 65° C. by suitably reducing the pressure. A light brownish toluene extract is separated from any water present and evaporated to dryness under reduced pressure.

Example 2

1 part of crude reserpine is dissolved in a mixture of 2 parts by volume of methanol and 2 parts by volume of glacial acetic acid. At an internal temperature of 60° C. 6 parts by volume of water are added, while stirring well, and the precipitated material is filtered off. The clear filtrate is inoculated with reserpine thiocyanate, and 0.4 part by volume of an aqueous solution of potassium thiocyanate of 50 percent strength is added at 60° C. while stirring well. After being cooled, the mixture is allowed to stand for a few hours and then filtered. The reserpine thiocyanate filtered off is then washed with methanol.

1 part of reserpine thiocyanate is suspended in 8 parts by volume of methanol and 4 parts by volume of ammonia solution of 3.5 percent strength, and the whole is stirred for 30 minutes at an internal temperature of 60° C. After being cooled, the whole is allowed to stand at room temperature for a few hours, and then the liberated reserpine is filtered off with suction. The residue is washed with water, methanol and a mixture of methanol and ether. In this manner pure reserpine is obtained.

Example 3

A mixture of 0.05 part of reserpine and 0.05 part of deserpidine is dissolved in 2 parts by volume of chloroform and 50 parts by volume of ether, and 10 parts by volume of a solution of thiocyanic acid, which has been prepared by mixing 10 parts by volume of an 0.1 N-methanolic solution of ammonium thiocyanate with 10 parts by volume of methanol and 2 parts by volume of glacial acetic acid and making up the mixture to 100 parts by volume with ether, are added dropwise while stirring mechanically. 25 parts by volume of petroleum ether are added to the mixture. After 15 minutes the precipitated reserpine thiocyanate is filtered off and washed with ether. There is obtained 0.066 part of reserpine thiocyanate melting at 239–240° C. (with decomposition). The filtrate, which contains practically only the deserpidine base, is extracted by agitation 7 times with 25 parts by volume of 2 N-acetic acid on each occasion, the acid solution is rendered alkaline with ammonia while cooling, and the product obtained is separated by filtration. There is obtained 0.037 part of a mixture of bases consisting of 85 percent of deserpidine and 15 percent of reserpine.

Example 4

By using, instead of 10 parts by volume of thiocyanic acid solution, only 9 parts by volume thereof, and otherwise proceeding in the manner described in Example 3, there are obtained 0.062 part of reserpine thiocyanate and 0.041 part of deserpidine base which still contains 22 percent of reserpine.

Example 5

0.065 part of a mixture of deserpidine and reserpine obtained as described in Example 4, and containing 22 percent of reserpine, is dissolved in 2 parts by volume of chloroform and 100 parts by volume of ether are added. There are then added 2.5 parts by volume of the methanolic solution of thiocyanic acid described in Example 1, 5 parts by volume of petroleum ether are added, and, after being stirred mechanically for 15 minutes, the mixture is filtered. In this manner there is obtained 0.016 part of reserpine thiocyanate and 0.045 part of a mixture of bases consisting of 87 percent of deserpidine and 13 percent of reserpine.

The reserpine thiocyanate obtained as described in any one of Examples 3–5 can be converted into pure reserpine as described in Example 1 or 2.

Example 6

1 part of an extract obtained from roots of *Rauwolfia vomitoria* Afz. or *Rauwolfia serpentina* Benth. is dissolved with the aid of heat in a mixture of 4 parts by volume of methanol and 1 part by volume of glacial acetic acid, and the solution mixed, while being stirred, with 6 parts by volume of water, and the precipitate is separated by filtration while the mixture is still warm. The filtrate is inoculated at about 60° C. with reserpine thiocyanate and mixed, while being stirred, with 0.5 part by volume of 50% aqueous potassium thiocyanate solution. The mixture is allowed to stand at room temperature for a few hours and then filtered with suction, the crude reserpine thiocyanate remaining on the filter is washed with methanol. The resulting salt can be converted into the basic reserpine as described in Example 1.

The extract used as starting material (which has an alkaloid content of about 0.2 to 0.3 part by weight) can be prepared as described in Example 1.

Example 7

1 part of ethylene chloride extract obtained from root material of *Rauwolfia vomitoria* Afz. or *Rauwolfia serpentina* Benth. is dissolved with the aid of heat in a mixture of 8 parts by volume of methanol and 2 parts by volume of glacial acetic acid. At an internal temperature of about 40° C. there are added 6 parts by volume of water with good stirring, and the precipitate is separated from the mixture while it is still warm. The clear filtrate is inoculated with reserpine thiocyanate and mixed at an internal temperature of 60° C. while being stirred well with 2 parts by volume of 50% aqueous potassium thiocyanate solution. After cooling, the mixture is allowed to stand for several hours and then filtered. The crude reserpine thiocyanate is separated by filtering with suction and washed with methanol. It can be converted into the free reserpine in the manner described in Example 1.

The ethylene chloride extract (having an alkaloid content of about 0.1 part by weight) which is used as starting material can be prepared by moistening homogeneously for example 1 part of ground roots of *Rauwolfia serpentina* Benth. or *Rauwolfia vomitoria* Afz. with about 0.8 part by volume of water and then extracting the material with 5–10 parts by volume of ethylene chloride for 5–7 hours under reflux. The brown ethylene chloride extract is separated from any water that may be present and then evaporated to dryness in vacuo.

What is claimed is:

1. Reserpine-thiocyanate.

2. Process for recovering sedative active alkaloids from plants of Rauwolfia species, which comprises reacting material from plants of Rauwolfia species consisting substantially of reserpine and other weakly basic alkaloids in a solvent selected from the group consisting of halogenated lower aliphatic hydrocarbons, lower alkanols, ethers, lower fatty acids, mixtures of such solvents and aqueous mixtures of such solvents with thiocyanic acid, separating the resulting precipitate, treating said precipitate with an alkaline agent to liberate the free base and isolating reserpine from the reaction mixture by crystallization.

3. Process for recovering sedative active alkaloids from plants of Rauwolfia species, which comprises reacting material from plants of Rauwolfia species consisting substantially of reserpine, deserpidine and other weakly basic alkaloids in a solvent selected from the group consisting of halogenated lower aliphatic hydrocarbons, lower alkanols, ethers, lower fatty acids, mixtures of such solvents and aqueous mixtures of such solvents with thiocyanic acid, separating the resulting precipitate and isolating deserpidine from the reaction medium freed from said precipitate.

4. Process for recovering sedative active alkaloids from plants of Rauwolfia species, which comprises reacting material from plants of Rauwolfia species consisting substantially of reserpine, deserpidine and other weakly basic alkaloids in a solvent selected from the group consisting of halogenated lower aliphatic hydrocarbons, lower alkanols, ethers, lower fatty acids, mixtures of such solvents and aqueous mixtures of such solvents with thiocyanic acid, separating the resulting precipitate, treating said precipitate with an alkaline agent to liberate the free base and isolating reserpine from the liberated free base by crystallization and isolating deserpidine from the mother liquors of the reserpine crystallization.

5. In a process for recovering sedative active alkaloids from plants of the Rauwolfia species the step which comprises reacting an extract obtained from plants of the Rauwolfia species by extraction with trichloroethylene and consisting substantially of reserpine and other weakly basic alkaloids in a solvent selected from the group consisting of halogenated lower aliphatic hydrocarbons, lower alkanols, ethers, lower fatty acids, mixtures of such solvents and aqueous mixtures of such solvents with thiocyanic acid, whereby the alkaloid thiocyanates are formed.

6. In a process for recovering sedative active alkaloids from plants of the Rauwolfia species, the step which comprises reacting a material consisting substantially of reserpine and other weakly basic alkaloids in a solvent selected from the group consisting of halogenated lower aliphatic hydrocarbons, lower alkanols, ethers, lower fatty acids, mixtures of such solvents and aqueous mixtures of such solvents with thiocyanic acid, whereby the alkaloid thiocyanates are formed.

References Cited in the file of this patent

UNITED STATES PATENTS 2,752,351   Schlittler et al. _____ June 26, 1956